US012666398B2

(12) United States Patent
Hong

(10) Patent No.: US 12,666,398 B2
(45) Date of Patent: Jun. 23, 2026

(54) METHOD FOR PROCESSING PAGING CAUSE AND APPARATUS, COMMUNICATION DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 325 days.

(21) Appl. No.: 18/553,489

(22) PCT Filed: Apr. 1, 2021

(86) PCT No.: PCT/CN2021/084949
§ 371 (c)(1),
(2) Date: Sep. 29, 2023

(87) PCT Pub. No.: WO2022/205314
PCT Pub. Date: Oct. 6, 2022

(65) Prior Publication Data
US 2024/0188041 A1     Jun. 6, 2024

(51) Int. Cl.
*H04W 68/02* (2009.01)
*H04W 8/18* (2009.01)

(52) U.S. Cl.
CPC ............. *H04W 68/02* (2013.01); *H04W 8/18* (2013.01)

(58) Field of Classification Search
CPC ................................ H04W 68/02; H04W 8/18
USPC .......................................................... 455/458
See application file for complete search history.

(56) References Cited

U.S. PATENT DOCUMENTS

| | | | |
|---|---|---|---|
| 2020/0305118 A1* | 9/2020 | Ryu ....................... | H04W 76/10 |
| 2020/0374833 A1 | 11/2020 | Guo et al. | |
| 2021/0014822 A1 | 1/2021 | Gurumoorthy et al. | |
| 2021/0352619 A1* | 11/2021 | Ryu ....................... | H04W 60/04 |
| 2022/0217675 A1* | 7/2022 | Chen ..................... | H04W 68/02 |
| 2022/0361132 A1* | 11/2022 | Gurumoorthy ..... | H04W 60/005 |
| 2023/0269701 A1* | 8/2023 | Hong ................... | H04W 68/005 |
| | | | 455/458 |
| 2023/0328688 A1* | 10/2023 | Kumar .................. | H04W 60/00 |
| | | | 455/458 |
| 2023/0328789 A1* | 10/2023 | Pu ....................... | H04W 72/569 |
| | | | 370/329 |

(Continued)

FOREIGN PATENT DOCUMENTS

| | | |
|---|---|---|
| CN | 102448026 A | 5/2012 |
| CN | 102448167 A | 5/2012 |

(Continued)

OTHER PUBLICATIONS

International Search Report Issued Jan. 7, 2022, in PCT/CN2021/084849, filed on Apr. 1, 2021, 2 pages.

(Continued)

*Primary Examiner* — Mark G. Pannell
(74) *Attorney, Agent, or Firm* — Oblon, McClelland, Maier & Neustadt, L.L.P.

(57)     ABSTRACT

Embodiments of the present application provide a paging cause processing method and apparatus, a communication device, and a storage medium. The paging cause processing method performed by a base station comprises: sending a paging cause to a specific terminal.

18 Claims, 6 Drawing Sheets

(56) References Cited

U.S. PATENT DOCUMENTS

| | | | | |
|---|---|---|---|---|
| 2023/0371001 A1* | 11/2023 | Hong | .................... | H04W 68/02 |
| 2024/0023060 A1* | 1/2024 | Hong | ................. | H04W 68/005 |
| 2024/0023065 A1* | 1/2024 | Hong | .................... | H04W 68/02 |
| 2024/0023067 A1* | 1/2024 | Ke | ...................... | H04W 68/005 |
| 2024/0179678 A1* | 5/2024 | Hong | .................... | H04W 68/02 |
| 2024/0196364 A1* | 6/2024 | Hong | ................. | H04W 68/005 |
| 2024/0196372 A1* | 6/2024 | Hong | .................... | H04W 68/02 |
| 2024/0340850 A1* | 10/2024 | Hong | ................. | H04W 68/005 |
| 2025/0240769 A1* | 7/2025 | Hong | .................... | H04W 68/02 |

FOREIGN PATENT DOCUMENTS

| | | |
|---|---|---|
| CN | 110730445 A | 1/2020 |
| CN | 111836219 A | 10/2020 |
| CN | 112166634 A | 1/2021 |
| WO | WO 2018/005419 A1 | 1/2018 |

OTHER PUBLICATIONS

Chinese Office Action issued Apr. 26, 2022, in Chinese Application 202180001060.3, 8 pages.
Chinese Office Action issued Jan. 10, 2023, in Chinese Application 202180001060.3, 9 pages.
Qualcomm Incorporated "Service Type in Paging and Busy Indication; R2-2100447;" 3GPP TSG-RAN WG2 Meeting #113e, Feb. 5, 2021, 4 pages.
3GPP TSG-RAN WG2 Meeting #113-e "Discussion on Supporting of Paging Cause" (R2-2100476), vivo, Jan. 25-Feb. 5, 2021, 5 pages.
3GPP TSG-RAN WG2 Meeting #113-e "Discussion on support of paging cause for Multi-SIM devices", (R2-2100200) Samsung, Jan. 25-Feb. 5, 2021, 3 pages.
3GPP TSG-RAN WG3 Meeting #111-e "Summary of Offline Discussion on CB #18_Basket_USIM", (R3-210981) , Jan. 25-Feb. 4, 2021, 10 pages.

* cited by examiner

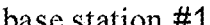
base station #1
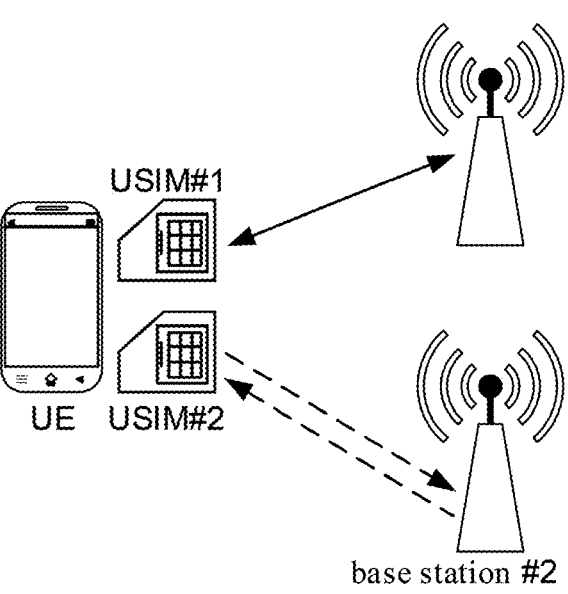
USIM#1
UE  USIM#2
base station #2
Fig. 4
apparatus
for processing paging cause
first sending module 510
Fig. 5
apparatus
for processing paging cause
second receiving module
610
Fig. 6

METHOD FOR PROCESSING PAGING CAUSE AND APPARATUS, COMMUNICATION DEVICE, AND STORAGE MEDIUM

CROSS REFERENCE TO RELATED APPLICATION(S)

The present application is a U.S. National Stage of International Application No. PCT/CN2021/084949 filed on Apr. 1, 2021, the content of which is incorporated herein by reference in its entirety for all purposes.

BACKGROUND

Technical Field

The present disclosure relates to the field of wireless communication technology, but is not limited to the field of wireless communication technology, and in particular, relates to a method and an apparatus for processing a paging cause, a communication device, and a storage medium.

Description of the Related Art

With the development of wireless communication technology, there are more and more multi-SIM terminals on the market. Currently, the processing method for a multi-SIM terminal is mainly based on the specific implementation of various terminal manufacturers, and there is no unified standard. This leads to various terminal behaviors and processing methods that may be quite different, such as dual-card single-standby, dual-card dual-standby single-active, and dual-card dual-standby dual-active terminals, the communication behavior of which is very different from the single-card single-standby terminal. However, most of the behaviors in the current cellular mobile communications are still designed for the single-card single-standby terminal, which may lead to the communication incompatibility for the multi-SIM terminal, and in turn lead to problems such as poor communication quality or low user satisfaction due to this incompatibility.

SUMMARY

The present disclosure provides a method and an apparatus for processing a paging cause, a communication device, and a non-transitory storage medium.

A first aspect of the present disclosure provides a method for processing a paging cause, which is performed by a base station. The method includes: sending the paging cause to a specific terminal.

A second aspect of the present disclosure provides a method for processing a paging cause, which is performed by a specific terminal. The method includes: receiving the paging cause sent by a base station.

A third aspect of the present disclosure provides a communication device, including: a processor, a transceiver, a memory, and an executable program stored on the memory and configured to be executed by the processor. The processor is configured, when executing the executable program, to perform the method for processing the paging cause as provided in the first aspect or the second aspect.

It should be understood that the above general description and the following detailed description are only examples and explanatory, and do not limit the embodiments of the present disclosure.

BRIEF DESCRIPTION OF THE DRAWINGS

The accompanying drawings, which are incorporated in and constitute a part of the present specification, illustrate embodiments consistent with the present disclosure and together with the description serve to explain the principle of embodiments of the present disclosure.

FIG. 4 is a schematic flowchart of a method for processing a paging cause according to an embodiment;

FIG. 5 is a schematic structural diagram of an apparatus for processing a paging cause according to an embodiment;

FIG. 6 is a schematic structural diagram of an apparatus for processing a paging cause according to an embodiment;

DETAILED DESCRIPTION OF THE PREFERRED EMBODIMENTS

Embodiments will be described in detail herein, examples of which are illustrated in the accompanying drawings. When the following description refers to the drawings, unless otherwise indicated, the same reference numbers in different drawings refer to the same or similar elements. The implementations described in the following embodiments do not represent all the implementations consistent with embodiments of the present disclosure. Instead, they are merely examples of apparatus and methods consistent with aspects of embodiments of the present disclosure as detailed in the appended claims.

The terminology used in embodiments of the present disclosure is for the purpose of describing specific embodiments only, and is not intended to limit the embodiments of the present disclosure. As used in the embodiments of the present disclosure and the appended claims, the singular forms "a," "an", and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used to describe various information in embodiments of the present disclosure, the information should not be limited to these terms. These terms are only used to distinguish information of the same type from each other. For example, without departing from the scope of the embodiments of the present disclosure, the first information may also be called the second information, and similarly, the second information may also be called the first information. Depending on the context, the word "if" as used herein may be interpreted as "when" or "while" or "in response to determining".

Figures 1, 2A:
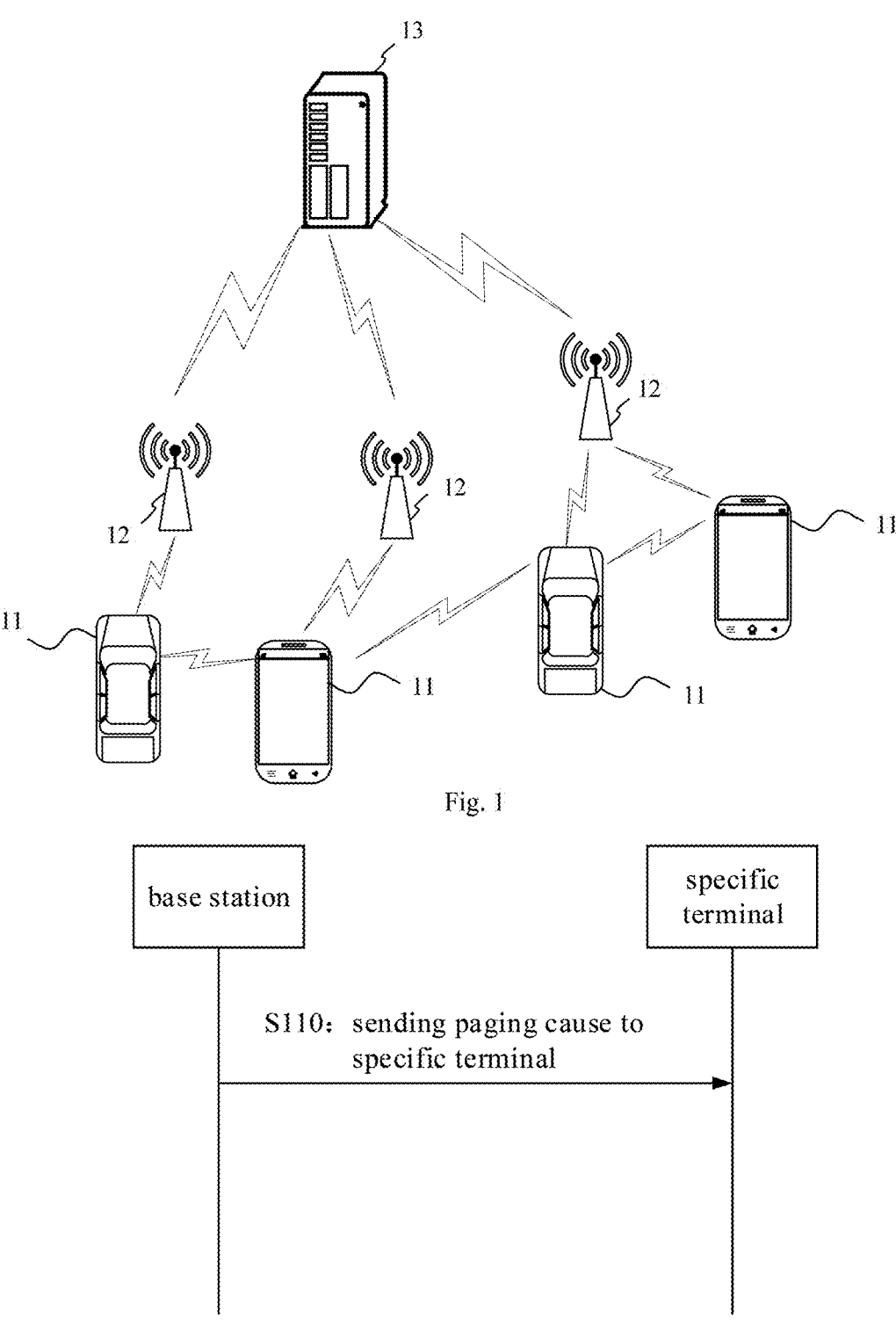
FIG. 1 is a schematic structural diagram of a wireless communication system according to an embodiment.
FIG. 2A is a schematic flowchart of a method for processing a paging cause according to an embodiment.

Reference may be made to FIG. 1, which shows a schematic structural diagram of a wireless communication system provided by an embodiment of the present disclosure. As shown in FIG. 1, the wireless communication system is a communication system based on cellular mobile communication technology. The wireless communication system may include several UEs 11 and several access devices 12.

UEs 11 may be a device that provides voice and/or data connectivity to users. UEs 11 may communicate with one or more core networks via a Radio Access Network (RAN). UEs 11 may be an Internet of Things UE, such as a sensor device, a mobile phone (also called "cellular" phone), or a computer with an Internet of Things UE. For example, it may be a fixed, portable, pocket-sized, handheld, computer-built-in, or vehicle-mounted device. As an example, it may be a station (STA), subscriber unit, subscriber station, mobile station, mobile, remote station, access point, remote UE (also called remote terminal), access UE (also called access terminal), user terminal, user agent, user device, or user UE (also called user equipment). Alternatively, UEs 11 may also be a device for an unmanned aerial vehicle. Alternatively, UEs 11 may also be a vehicle-mounted device. For example, it may be a driving computer with a wireless communication function, or a wireless communication device connected to an external driving computer. Alternatively, UEs 11 may also be a roadside device. For example, it may be a streetlight, a signal light, or other roadside devices with a wireless communication function.

The access device 12 may be a network-side device in the wireless communication system. The wireless communication system may be the 4th generation mobile communication (4G) system, also known as the Long Term Evolution (LTE) system. Alternatively, the wireless communication system may also be a 5G system, also called new radio (NR) system or 5G NR system. Further alternatively, the wireless communication system may also be a next-generation system of the 5G system. The access network in the 5G system may be called New Generation-Radio Access Network (NG-RAN) or MTC system.

The access device 12 may be an evolved access device (eNB) used in the 4G system. Alternatively, the access device 12 may also be an access device (gNB) using a centralized distributed architecture in the 5G system. When the access device 12 adopts the centralized distributed architecture, it usually includes a centralized unit (CU) and at least two distributed units (DUs). The centralized unit is equipped with a protocol stack including a Packet Data Convergence Protocol (PDCP) layer, a Radio Link Control (Radio Link Control, RLC) protocol layer, and a Media Access Control (MAC) layer. The centralized unit is provided with a physical (PHY) layer protocol stack. Embodiments of the present disclosure do not limit the specific implementation of the access device 12.

A wireless connection may be established between the access device 12 and UEs 11 through a wireless air interface. In different implementations, the wireless air interface is a wireless air interface based on the 4th generation mobile communication network technology (4G) standard. Or, the wireless air interface is a wireless air interface based on the 5th generation mobile communication network technology (5G) standard. For example, the wireless air interface is a new air interface. Alternatively, the wireless air interface may also be a wireless air interface based on the next generation mobile communication network technology standard of 5G.

In some embodiments, an End to End (E2E) connection may also be established between UEs 11. Examples may include the vehicle to vehicle (V2V) communication, the vehicle to Infrastructure (V2I) communication, and the vehicle to pedestrian (V2P) communication in the vehicle to everything (V2X) scene.

In some embodiments, the above-mentioned wireless communication system may also include a network management device 13.

Several access devices 12 are connected to the network management device 13 respectively. The network management device 13 may be a core network device in the wireless communication system. For example, the network management device 13 may be a Mobility Management Entity (MME) in an Evolved Packet Core (EPC). Alternatively, the network management device may also be other core network devices, such as Serving GateWay (SGW), Public Data Network GateWay (PGW), Policy and Charging Rules functional (PCRF) unit, or Home Subscriber Server (HSS), etc. Embodiments of the present disclosure do not limit the implementation form of the network management device 13.

As shown in FIG. 2A, an embodiment of the present disclosure provides a method for processing a paging cause, which is performed by a base station. The method includes: S110, sending the paging cause to a specific terminal.

The paging cause here indicates the cause for sending the paging message.

In the technical solution provided by embodiments of the present disclosure, the base station sends a paging cause to a specific terminal. The paging cause may be used by the specific terminal to determine, based on the paging cause, whether to respond to the paging message sent by the base station, thereby reducing interferences to the current service provided by the specific terminal due to unnecessary emergency paging responses. This further improves the problem of service interruption or large delay caused by the response by the specific terminal to unexplained paging messages, the quality of communication services provided by the specific terminal, and also the user satisfaction.

In one embodiment, the paging cause is classified according to the service type, including voice service and/or non-voice service.

The service type of the voice service may be further subdivided into: streaming media call service; background call service; and conversation call service.

The service type of the non-voice service may be further subdivided into: internet service; video service; file download service; system message update, etc.

The above are only examples of the voice service and the non-voice service, and the specific implementation is not limited thereto.

In some embodiments, the base station may carry the paging cause when sending the paging message. If the paging cause is carried, the paged terminal will know the cause for being paged this time, and may then determine whether to respond to the paging based on the paging cause for being paged this time. If the paged service is not very urgent, the UE (i.e. terminal) may continue to maintain the idle state or inactive state in this low-power state, or, without switching connections, may interrupt or suspend the current connection established with other networks (or communication systems) and switch to the network (or communication system) for sending the paging message.

For example, the paging cause may carry a service identifier that triggers the sending of this paging message, or carry the quality of service (QoS) for the service, etc.

In short, by sending the paging cause, at least the specific terminal can determine whether to respond to the paging of the corresponding network.

In some embodiments, the specific terminal at least includes: a terminal having at least two subscriber identity modules SIMs.

Some terminals are multi-SIM terminals. These multi-SIM terminals may be installed with two or more SIMs. These SIMs may be physical SIM cards carried by physical cards, or may be electronic SIM cards (i.e. eSIM). In some embodiments, the specific terminal may be a terminal capable of connecting to different communication systems. For example, the terminal may be connected to communication systems of different operators, or connected to communication systems of different communication standards that are not integrated.

In an embodiment of the present disclosure, due to the limitation of the number of antennas and/or wireless communication modules such as radio frequency links, if the specific terminal needs to switch to communicate with another communication system while the specific terminal is communicating with one communication system, the currently ongoing communication may be interfered. Therefore, while the specific terminal is communicating with one communication system, if it receives a paging message from another communication system and also receives the paging cause, it can be determined based on the paging cause whether to respond to the paging message or to delay responding to the paging message.

For example, the method for processing the multi-SIM terminal is mainly based on the implementation of various terminal manufacturers, and there is no unified standard. This leads to various terminal behaviors and processing methods that may be quite different. For example, the dual-card single-standby, dual-card dual-standby single-active, dual-card dual-standby dual-active terminals, etc. may have one or more of the following problems.

When the multi-SIM terminal is communicating with the first communication system, it needs to monitor the second communication system from time to time, for example, by monitoring the paging message of the second communication system, performing measurements of the second communication system, and reading the system message of the second communication system, etc., which may have an impact on the performance of the first communication system.

The paging time is calculated based on the terminal's identity, and the multi-SIM terminal may cause systematic paging collisions due to multiple SIM cards thereof.

When the multi-SIM terminal receives the paging message on the second communication system, it needs to decide whether the multi-SIM terminal needs to respond to the paging message, and this decision is based on rules configured by the user.

When the multi-SIM terminal decides to respond to the paging message of the second communication system, it needs to stop the operation currently being performed in the first communication system. If there is no suspension mechanism for the current activity, the terminal will automatically disconnect the RRC connection with the first communication system and leave. Moreover, when the terminal leaves, the first communication system will continue to page the UE, resulting in a waste of paging resources.

When the terminal reads paging or measures in the second communication system, it will cause a short interval of about 20 ms in the first communication system. For the first communication system, this is similar to experiencing shadow fading, but it will occur once in every paging cycle. Therefore, this may affect the power control and link adaptation algorithms of the network, thereby causing a waste of resources in the first communication system.

When the terminal decides to switch to the cell of the second communication system, it needs to read the system information in the second communication system. This will cause a long interval of about 1 second in the first communication system. The first communication system will consider this as an error condition. It's unclear how terminals and networks handle this situation.

When the terminal performs Tracking Area Update (TAU) in the second communication system, it will cause a longer interval of several seconds in the first communication system. Therefore, the impact on the first communication system is greater.

In this way, by sending the paging message to the specific terminal, the base station helps to enable the specific terminal to determine whether to respond to paging based on the paging cause, thereby reducing the communication interference in another communication system.

Figures 2B, 2C, 3A:
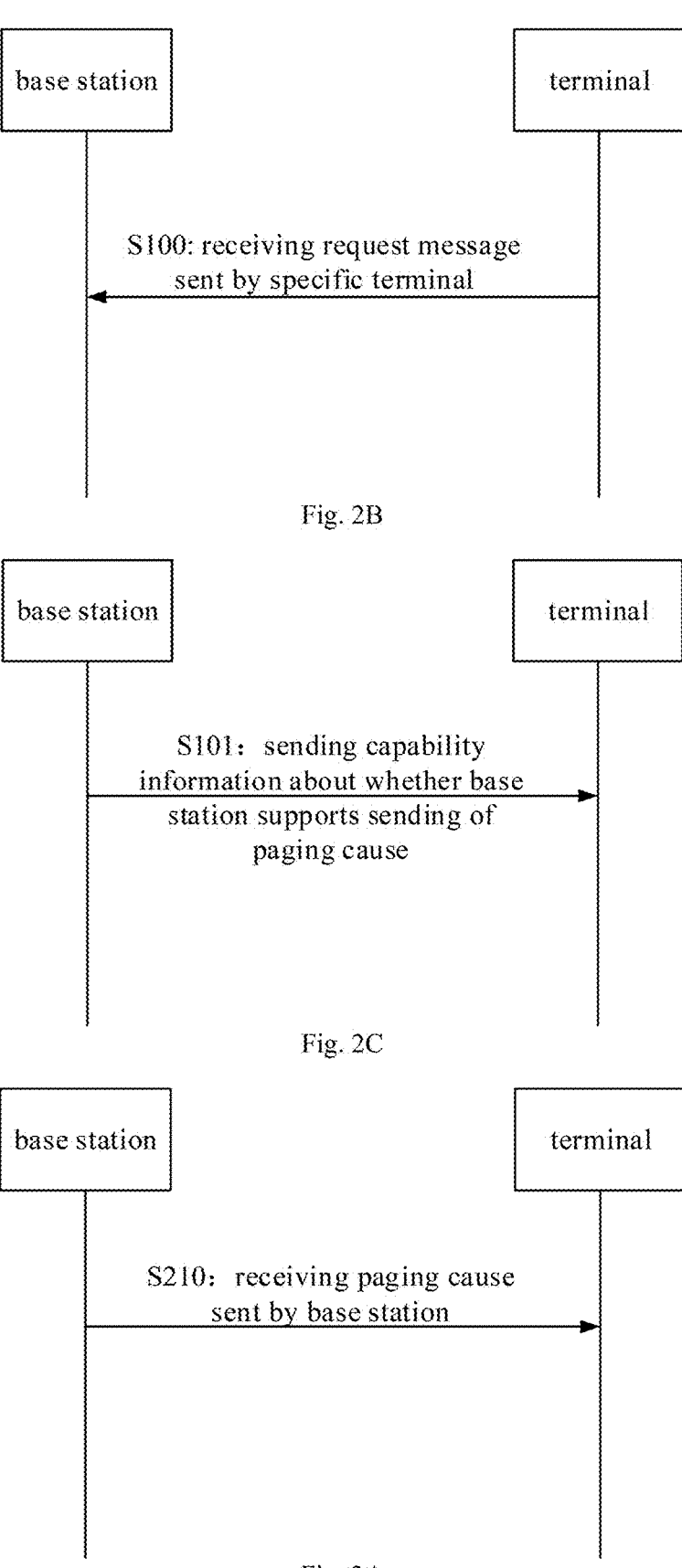
FIG. 2B is a schematic flowchart of a method for processing a paging cause according to an embodiment.
FIG. 2C is a schematic flowchart of a method for processing a paging cause according to an embodiment.
FIG. 3A is a schematic flowchart of a method for processing a paging cause according to an embodiment.

In some embodiments, as shown in FIG. 2B, an embodiment of the present disclosure provides a method for processing a paging cause, including: S100, receiving the request message sent by the specific terminal.

The reception of the request message may be implemented seperately or in combination with step S210.

The step S110 may include: sending the paging cause to the specific terminal based on the request message.

Some terminals have strong terminal capabilities and support communications with two communication systems at the same time. Therefore, it is unnecessary for these terminals to know whether to send the paging cause. For example, the base station supports the sending of the paging message. But, in order to save the signaling overhead, the base station only send the paging cause to the specific terminal that sends the request message, and does not need to send the paging cause to the terminal that does not send the request message. This helps to save the signaling overhead.

In some embodiments, the step S110 may include: sending the paging cause to the specific terminal based on a protocol provision; or sending the paging cause to the specific terminal based on a pre-negotiation between the base station and the specific terminal; or sending the paging cause to the specific terminal based on the paging message received from the core network.

For the specific terminal, the communication protocol may stipulate that the paging cause needs to be sent to these terminals. At this time, the base station may send the paging cause to the specific terminal based on the protocol.

In some cases, the base station and the specific terminal may also negotiate in advance. For example, when the specific terminal accesses the cell, the base station sends inquiry information about whether to receive the paging cause, and the specific terminal realizes pre-negotiation by replying to the paging information. In addition, when the cell formed by the current base station is accessed by the specific terminal UE, the fact that the specific terminal expects to receive the paging cause may be determined by interacting with the base station information of the UE's previous serving cell.

In some embodiments, in order to reduce phenomenons such as the specific terminal failing to respond to the paging from the core network in time, the paging cause is sent to the specific terminal after the paging message is received from the core network.

In an embodiment of the present disclosure, the paging message associated with the paging cause may include: a paging message sent by the core network, or a Radio Access Network (RAN) paging message for paging a specific type of UE in an inactive state.

In some embodiments, the step S110 may include: in response to the base station supporting the sending of the paging cause, sending the paging cause to the specific terminal.

In some cases, the base station supports the sending of the paging cause. In some cases, the base station may not support the sending of the paging cause. Therefore, the paging cause is sent to the specific terminal only when the base station supports the sending of the paging cause. If the base station does not support the sending of the paging cause, the paging cause will not be sent to the specific terminal.

For example, if the base station is configured with the sending capability for the paging cause, then the base station supports the sending of the paging cause. If the base station is not configured with the sending capability for sending the paging message, then the base station does not support the sending of the paging cause.

As shown in FIG. 2C, an embodiment of the present disclosure provides a method for processing capability information of a base station, which includes: S101, sending capability information about whether the base station supports sending of a paging cause.

The step of sending the capability information may be implemented in conjunction with the aforementioned steps of sending the paging cause and/or receiving the request message requesting the paging cause, or may be implemented separately.

The capability information may include one or more bits. These bits are used for sending information indicating support when the base station supports the sending of the paging cause, and are further used for sending information indicating non-support when the base station does not support the sending of the paging cause.

In this way, after receiving the capability information sent by the base station, the terminal located in the cell formed by the base station can know whether the base station supports the sending of the paging cause. If the base station supports the sending of the paging cause, it may request the base station to send the paging cause when necessary.

In some embodiments, the base station may broadcast the capability information indicating whether the base station supports the sending of the paging cause. The base station may also multicast the capability information indicating whether the base station supports the sending of the paging cause. Alternatively, the base station may also unicast the capability information indicating whether the base station supports the sending of the paging cause.

If the base station broadcasts in the cell whether it supports the sending of the paging cause, then all the terminals in the cell can monitor the capability information. If the sending of the paging cause is designed for a specific terminal, the capability message about whether the base station supports the sending of the paging cause may be multicast downlink in the UE group including all specific terminals in the cell. In this case, only the terminal that is necessary to receive the sending of the paging cause will receive the capability information, and other terminals can ignore it, which helps to reduce information interferences.

In addition, the capability information may also be carried in RRC signaling, which is equivalent to unicasting to a specific terminal. For example, when the terminal establishes a connection with the base station, one or more RRC signaling will be exchanged. These RRC signalings may carry the capability information indicating whether the base station supports the sending of the paging cause. For example, the RRC signaling may be the signaling transmitted while the terminal accesses the established RRC connection of the cell formed by the base station, or may also be the paging cause carried during the random access process of the terminal. In this way, point-to-point sending and receiving is realized of the capability information about whether the base station of a single terminal supports the sending of the paging cause. The capability information is carried in the RRC signaling with existing functions in related technologies, and has characteristics such as low signaling overhead. For example, the capability information is carried by using reserved bits or reserved bit values of the RRC signaling existing in the related technologies.

In another embodiment, the capability information indicating whether the base station supports the sending of the paging cause may also be carried in the dedicated RRC signaling. For example, the RRC signaling may be designed specially to carry the capability information about whether the base station supports the sending of the paging cause.

The above example indicates that the terminal and the base station may exchange the capability information about whether the base station supports the sending of the paging cause when establishing an RRC connection. In other embodiments, the base station may also send the RRC signaling carrying the capability information to the terminal through the established RRC connection, after it establishes the RRC connection with the terminal.

Of course, the base station may also send the capability information to the terminal during the process of disconnecting the RRC connection with the terminal.

For example, the RRC signaling may be RRC reconfiguration (RRCReconfiguration) signaling or RRC release (Release) signaling.

As another example, if the capability information indicating whether the UE supports the sending of the paging cause is broadcast and sent, it may be delivered through various system message blocks.

In one embodiment, the capability information indicating whether the base station supports the sending of the paging cause may be carried and sent in the minimum system message. The minimum system message here includes: Master Information Block (MIB) and System Information Block (SIB) 1.

In another embodiment, the capability information indicating whether the base station supports the sending of the paging cause may also be carried in any other system message block (other SIB) other than the minimum system message.

As shown in FIG. 3A, an embodiment of the present disclosure provides a method for processing a paging cause, which is performed by a specific terminal. The method includes: S310, receiving the paging cause sent by a base station.

The specific terminal will receive the paging cause sent by the base station. Based on the paging cause, the specific terminal can determine whether to respond to the corresponding paging message; and/or to delay the response to the received paging message.

If the specific terminal does not respond to the paging message and the network side really needs to page the specific terminal, the network side will continue to send the paging message, so that the terminal will receive and respond to the paging message when it is suitable to receive the paging message.

If the specific terminal is currently not responding to the paging message, it may respond at one or more response times other than any response opportunity within a specific time period agreed with the base station. This helps to reduce the number of paging messages sent by the network side.

Figures 3B, 3C:
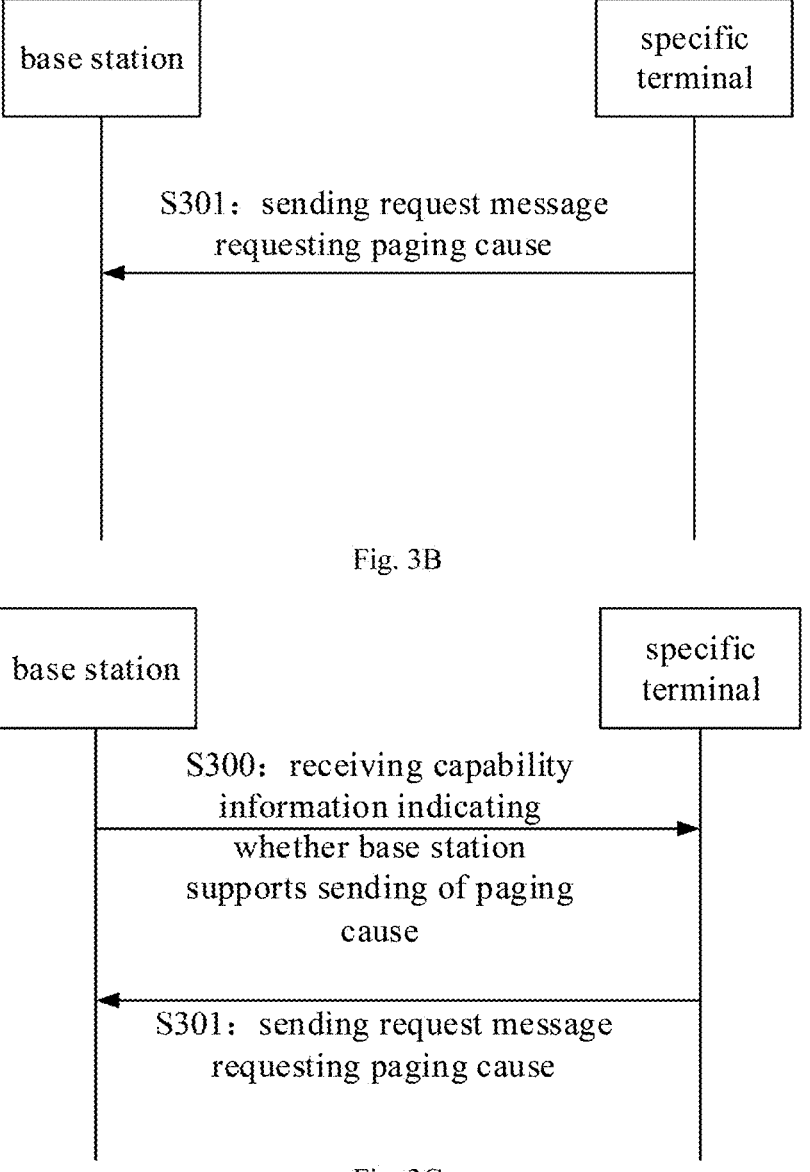
FIG. 3B is a schematic flowchart of a method for processing a paging cause according to an embodiment.
FIG. 3C is a schematic flowchart of a method for processing a paging cause according to an embodiment.

As shown in FIG. 3B, an embodiment of the present disclosure provides a method for processing a paging cause, which includes: S301, sending a request message requesting the paging cause.

If the specific terminal wants the base station to send the paging cause, it may send a request message requesting the paging cause to the base station. In this way, after receiving the request message, the base station will send the paging cause. For example, if the base station receives a request message requesting a paging cause sent by a specific terminal, the base station will send the paging message while carrying the paging cause.

As shown in FIG. 3C, an embodiment of the present disclosure provides a method for processing a paging cause, which includes: S300, receiving capability information indicating whether the base station supports the sending of the paging cause.

This step S300 may be implemented separately or in combination with the aforementioned steps S301 and/or S301. If S300 is implemented in conjunction with steps S310 and/or S301, the request message is sent after the base station is determined based on the capability information to support the sending of the paging cause.

Some base stations support the sending of the paging cause, and some base stations do not support the sending of the paging cause. Some base stations temporarily do not support the sending of the paging cause. At this time, the base station may inform the specific terminal, through the sending of the capability information, about whether it supports the sending of the paging cause.

At this time, when the specific terminal receives the capability information, it may determine whether to send a request message requesting a paging message according to its own needs.

In some embodiments, the sending of the request message requesting the paging cause includes: in response to the specific terminal establishing a connection with a first base station based on a first user identity module, sending the request message requesting the paging cause to a second base station based on a second user identity module of the specific terminal.

The first base station and the second base station here may be base stations belonging to different communication systems, or base stations operating different communication base stations, or base stations constructing different wireless communication networks.

It is assumed that the specific terminal supports establishing connections with base stations of multiple different communication systems or different communication networks, the current user identity module (i.e., the first user identity module) has established a connection with the base station of a certain communication system or network, and another user identity module (i.e., the first user identity module) receives a request message for sending the paging cause by another communication system or network. If the paging message of the second base station is immediately responded, the second user identity module may be caused to compete with the first user identity module for the software and hardware resources of the specific terminal, thereby causing the connection between the first user identity module and the first base station to be disconnected or failed. If, at this time, data is being transmitted over the connection established between the first user identity module and the first base station, or data is about to be transmitted immediately, phenomenons may be caused, such as the communication service participated by the first user identity module being interrupted.

In some embodiments, the sending of the request message requesting the paging cause to the second base station based on the second user identity module of the specific terminal, in response to the specific terminal establishing the connection with the first base station based on the first user identity module, includes: in response to the specific terminal establishing the connection with the first base station based on the first user identity module and transmitting on the connection, sending the request message requesting the paging cause to the second base station based on the second user identity module of the specific terminal.

The content transmitted on the connection may include: control plane signaling and/or user plane data.

If the second user identity module receives the paging message from the second base station while the first user identity module establishes a connection with the first base station, and if the second user identity module responds to the paging message, the connection between the first user identity module and the first base station fails. However, if the paging message from the second base station is received and carries the paging cause of the paging message, according to the paging cause, the specific terminal may control the second user identity module to determine whether to respond to the paging message immediately, or not to respond the paging message, or to delay the response to the paging message. In this way, unnecessary disconnections of the connection between the first user identity module and the first base station can be reduced.

In some embodiments, the step of determining whether to respond to the paging message of the second base station based on the paging cause sent by the second base station, in response to the specific terminal establishing a connection with the first base station based on the first user identity module, may include the following contents.

In response to the specific terminal establishing a connection with the first base station based on the first user identity module, when the priority of the service triggering transmission of the paging message and indicated by the paging cause is higher than the priority of data transmission over the connection between the first user identity module and the first base station, or higher than the priority of upcoming data transmission over the connection between the first user identity module and the first base station, it responds to the paging message of the second base station. Otherwise, it does not respond to the paging message of the second base station.

In other embodiments, the step of determining whether to respond to the paging message of the second base station based on the paging cause sent by the second base station, in response to the specific terminal establishing a connection with the first base station based on the first user identity module, may include the following contents.

In response to the specific terminal establishing the connection with the first base station based on the first user identity module, when it is determined based on the paging cause sent by the second base station that the service triggering the second base station to send the paging message is a preset service, it responds to the paging message of the second base station. Otherwise, it does not respond to the paging message of the second base station.

The preset service includes but is not limited to: called voice service or Ultra Reliable Low Latency Communication (URLLC) service.

In an embodiment of the present disclosure, the first base station and the second base station may be base stations of different communication operators, or base stations of different systems, or base stations of different networks.

In some embodiments, embodiments of the present disclosure provide a method for processing a paging cause, which may include: the base station sending to the terminal whether it supports sending of the paging cause.

The base station may use a system message to send whether it supports sending of the paging cause.

The system message may be a minimum system message (minimum SI), and the base station always broadcasts the SI. The system message may also be other system message (other SI).

The base station may send whether it supports sending of the paging cause through unicast RRC signaling.

The multi-SIM terminal obtains information about whether the base station supports sending of the paging cause.

If the base station may send whether it supports sending of the paging cause through the minimum SI, the multi-SIM terminal directly reads the minimum SI to obtain this capability.

The base station may send whether it supports sending of the paging cause through other SI.

If a system message indicating whether the base station supports sending of the paging cause is being sent, the multi-SIM terminal directly reads the system message to obtain the capability.

If the system message indicating whether the base station supports sending of the paging cause is not being sent, the multi-SIM terminal may request the base station to send the system message indicating whether the base station supports sending of the paging cause. That is, when the terminal does not receive the capability information indicating whether the base station supports the sending of the paging message, the terminal may send the capability information indicating whether it supports the sending of the paging cause to the base station through a request message.

A base station that supports sending of the paging cause sends the paging cause to a specific terminal.

The specific terminal may be a multi-SIM terminal that needs to receive the paging cause.

The paging cause may be sent to the requesting multi-SIM terminal based on the multi-SIM terminal's request.

After the multi-SIM terminal obtains whether the base station supports sending of the paging cause, it sends a request to the base station when it needs to receive the paging cause.

As shown in FIG. 4, base station #2 supports sending of the paging cause. USIM #1 of the multi-SIM terminal is transmitting data with base station #1. After USIM #2 learns that base station #2 supports sending of the paging cause, it may send request signaling to base station #2 to request that base station #2 simultaneously sends the paging cause while paging itself.

As shown in FIG. 5, an embodiment of the present disclosure provides an apparatus for processing a paging cause, which is provided in a base station, and the apparatus includes: a first sending module 510, configured to send the paging cause to a specific terminal.

In some embodiments, the first sending module 510 may be a program module. After the program module is executed by the processor, the paging cause can be sent.

In another embodiment, the first sending module 510 may also be a software-hardware combination module. The software-hardware combination module includes but is not limited to various programmable arrays. The programmable array includes: a field programmable array and/or a complex programmable array.

In some embodiments, the first sending module 510 may also include a pure hardware module. The pure hardware module includes but is not limited to an application specific integrated circuit.

In some embodiments, the apparatus further includes: a first receiving module, configured to receive the request message sent by the specific terminal.

The first sending module 510 is configured to send the paging cause to the specific terminal based on the request message.

In some embodiments, the first sending module 510 is configured to: send the paging cause to the specific terminal based on protocol provision; or send the paging cause to the specific terminal based on a pre-negotiation between the base station and the specific terminal; or send the paging cause to the specific terminal based on the paging message received from the core network.

In some embodiments, the first sending module 510 is configured to send the paging cause to the specific terminal in response to the base station supporting the sending of the paging cause.

In some embodiments, the first sending module 510 is further configured to send capability information about whether the base station supports the sending of the paging cause.

In some embodiments, the capability information is carried by system messages; or the capability information is carried by Radio Resource Control RRC signaling.

In some embodiments, the system message is: a minimum system message; or a system message block other than the minimum system message.

As shown in FIG. 6, an embodiment of the present disclosure provides an apparatus for processing a paging cause, which is included in a specific terminal. The apparatus includes: a second receiving module 610, configured to receive the paging cause sent by the base station.

In some embodiments, the second receiving module 610 may be a program module. After the program module is executed by the processor, the paging cause can be received.

In another embodiment, the second receiving module 610 may also be a software-hardware combination module. The software-hardware combination module includes but is not limited to various programmable arrays. The programmable array includes: a field programmable array and/or a complex programmable array.

In some embodiments, the second receiving module 610 may also include a pure hardware module. The pure hardware module includes but is not limited to an application specific integrated circuit.

In some embodiments, the apparatus further includes: a second sending module, configured to send a request message requesting the paging cause.

In some embodiments, the apparatus further includes: a second receiving module 610, configured to receive capability information indicating whether the base station supports the sending of the paging cause. The request message is sent after the base station is determined based on the capability information to support the sending of the paging cause.

In some embodiments, the second sending module is configured to: in response to the specific terminal establishing a connection with the first base station based on the first user identity module, send a request message requesting the paging cause to the second base station based on the second user identity module of the specific terminal.

In some embodiments, the second sending module is configured to: in response to the specific terminal establishing a connection with the first base station based on the first user identity module and transmitting on the connection, send a request message requesting the paging cause to the second base station based on the second user identity module of the specific terminal.

In some embodiments, the apparatus further includes a response module, configured to: in response to the specific terminal establishing a connection with the first base station based on the first user identity module, determine whether to respond to the paging message of the second base station based on the paging cause sent by the second base station.

An embodiment of the present disclosure provides a communication device, including: a memory, configured to store instructions executable by a processor; and the processor, connected to the memory.

The processor is configured to perform the method for processing a paging cause as provided by any of the foregoing technical solutions.

The processor may include various types of storage media, which are non-transitory computer storage media that can continue to store information stored thereon after the communication device is powered off.

Here, the communication device includes: an access device or UE or core network device.

The processor may be connected to the memory through a bus, etc., and is used for reading the executable program stored in the memory, for example, at least one of the methods shown in FIGS. 2A, 2B, 2C, 3A, 3B, and 3C.

Figure 7:
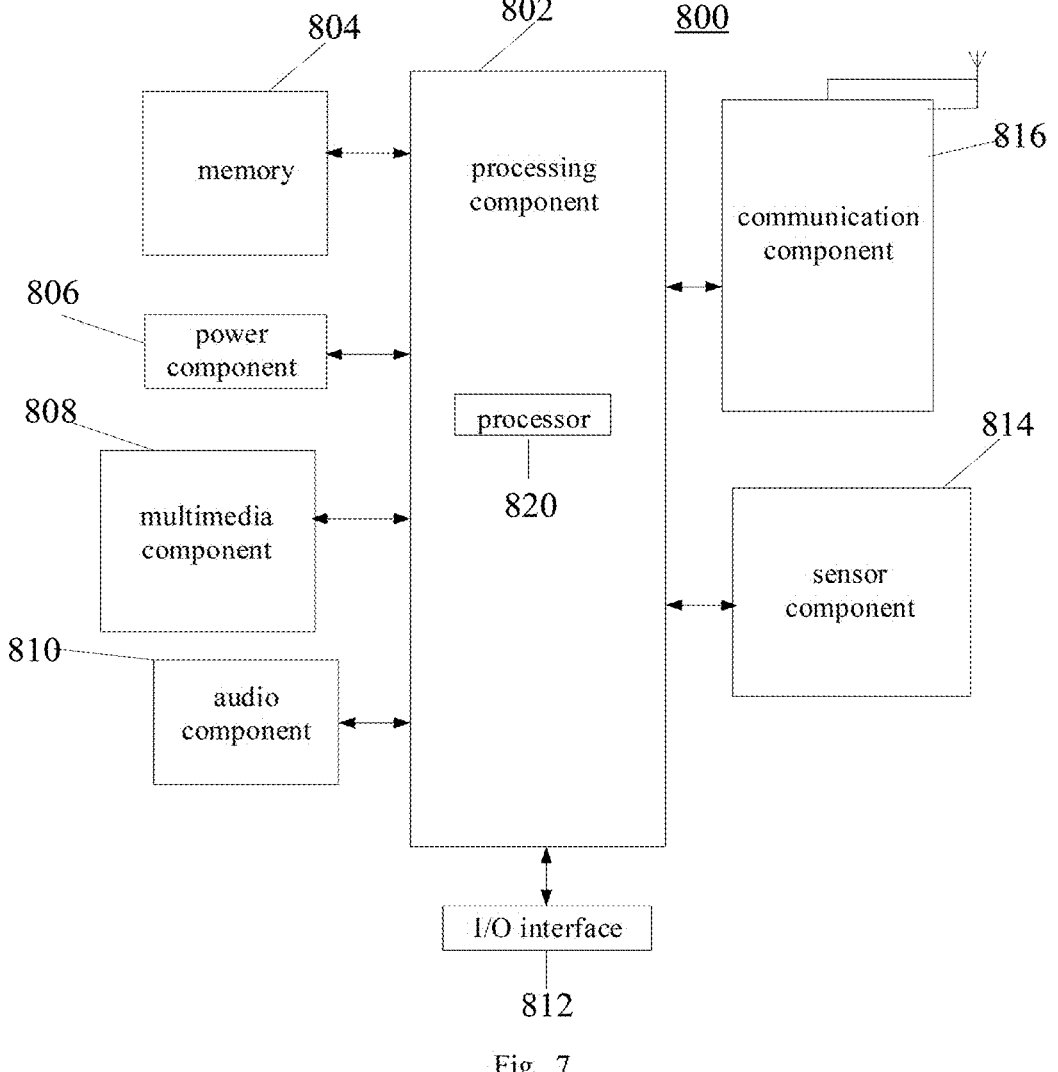
FIG. 7 is a schematic structural diagram of a UE according to an embodiment.

FIG. 7 is a block diagram of a UE (i.e., the aforementioned terminal) 800 according to an embodiment. For example, UE 800 may be a mobile phone, computer, digital broadcast user equipment, messaging device, game console, tablet device, medical device, fitness device, personal digital assistant, etc.

Referring to FIG. 7, UE 800 may include one or more of the following components: processing component 802, memory 804, power component 806, multimedia component 808, audio component 810, input/output (I/O) interface 812, sensor component 814, and communication component 816.

The processing component 802 generally controls the overall operations of UE 800, such as operations associated with display, phone call, data communication, camera operation, and recording operation. The processing component 802 may include one or more processors 820 to execute instructions, so as to complete all or part of the steps in the above method. Additionally, the processing component 802 may include one or more modules that facilitate interactions between the processing component 802 and other components. For example, the processing component 802 may include a multimedia module, so as to facilitate interactions between the multimedia component 808 and the processing component 802.

The memory 804 is configured to store various types of data to support operations at UE 800. Examples of these data include: instructions for any application or method operating on the UE 800, contact data, phonebook data, messages, pictures, videos, etc. The memory 804 may be implemented by any type of volatile or non-volatile storage device, or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk.

The power component 806 provides power to various components of UE 800. The power component 806 may include a power management system, one or more power supplies, and other components associated with generating, managing, and distributing power to UE 800.

The multimedia component 808 includes a screen that provides an output interface between the UE 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundary of a touch or slide action, but also detect the duration and pressure associated with the touch or slide action. In some embodiments, the multimedia component 808 includes a front camera and/or a rear camera. When UE 800 is in an operation mode, such as shooting or video mode, the front camera and/or the rear camera may receive external multimedia data. Each of the front camera and the rear camera may be a fixed optical lens system or have a focal length and the optical zooming capability.

The audio component 810 is configured to output and/or input audio signals. For example, the audio component 810 includes a microphone (MIC), configured to receive external audio signals when UE 800 is in an operation mode, such as call mode, recording mode, and voice recognition mode. The received audio signal may be further stored in the memory 804 or sent via the communication component 816. In some embodiments, the audio component 810 also includes a speaker for outputting audio signals.

The I/O interface 812 provides an interface between processing component 802 and a peripheral interface module, which may be a keyboard, a click wheel, a button, etc. These buttons may include, but are not limited to: Home button, Volume button, Start button, and Lock button.

The sensor component 814 includes one or more sensors that provide various aspects of status assessment for UE 800. For example, the sensor component 814 may detect the open/closed state of the device 800, the relative positioning among components such as display and keypad of the UE 800. The sensor component 814 may also detect the position change of the UE 800 or some component in the UE 800, presence or absence of the contact between the UE 800 and the user, orientation or acceleration/deceleration of the UE 800, and temperature change of the UE 800. The sensor assembly 814 may include a proximity sensor, configured to detect the presence of a nearby object without any physical contact. The sensor assembly 814 may also include a light sensor, such as a CMOS or CCD image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate wired or wireless communication between UE 800 and other devices. UE 800 may access wireless networks based on communication standards, such as WiFi, 2G, or 3G, or a combination thereof. In one embodiment, the communication component 816 receives broadcast signals or broadcast related information from an external broadcast management system via a broadcast channel. In one embodiment, the communication component 816 also includes a near field communication (NFC) module to facilitate short-range communications. For example, the NFC module may be implemented based on radio frequency identity (RFID) technology, infrared data association (IrDA) technology, ultra-wideband (UWB) technology, Bluetooth (BT) technology, and other technologies.

In an embodiment, the UE 800 may be implemented by one or more application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components for performing the above method.

In an embodiment, there is also provided a non-transitory computer-readable storage medium containing instructions, such as a memory 804 containing instructions. The instructions are executable by the processor 820 of the UE 800 to complete the above method. For example, the non-transitory computer-readable storage medium may be ROM, random access memory (RAM), CD-ROM, magnetic tape, floppy disk, optical data storage device, etc.

Figure 8:
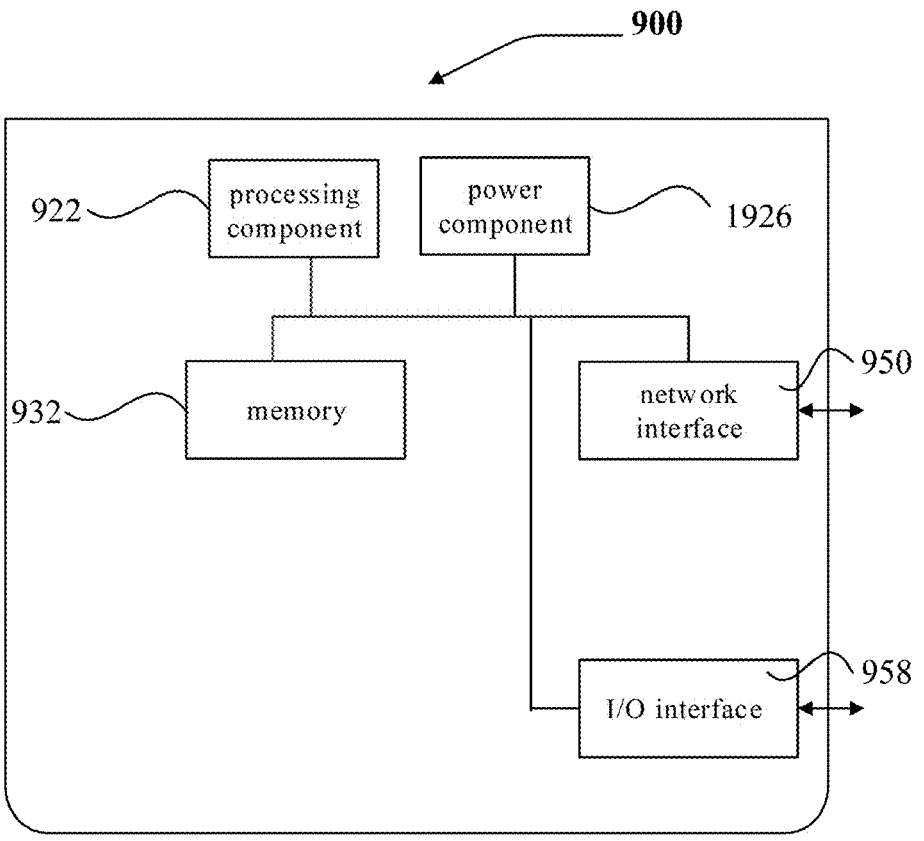
FIG. 8 is a schematic structural diagram of a communication device according to an embodiment.

As shown in FIG. 8, an embodiment of the present disclosure shows the structure of an access device. For example, the communication device 900 may be provided as a network side device. The communication device may be the aforementioned access device and/or core network device.

Referring to FIG. 8, the communications device 900 includes a processing component 922, which further includes one or more processors, and memory resources represented by the memory 932 for storing instructions, such as application programs, executable by the processing component 922. The application program stored in the memory 932 may include one or more modules, each corresponding to a set of instructions. In addition, the processing component 922 is configured to execute instructions, so as to perform any of the foregoing methods applied to the access device, such as at least one of the methods shown in FIGS. 2A, 2B 2C, 3A, 3B, and 3C.

The communication device 900 may also include: a power component 926, configured to perform power management of the communication device 900; a wired or wireless network interface 950, configured to connect the communication device 900 to a network; and an input-output (I/O) interface 958. The communication device 900 may operate based on an operation system stored in the memory 932, such as Windows Server™, Mac OS X™, Unix™, Linux™, FreeBSD™ or the like.

Other embodiments of the present disclosure will be readily apparent to those skilled in the art from consideration of the specification and practice of the contents disclosed herein. The present disclosure is intended to cover any variations, uses, or adaptations of the present disclosure that follow the general principle of the present disclosure and include common common sense or customary technical means in the technical field that are not disclosed in the present disclosure. It is intended that the specification and examples be considered as instances only, with the true scope and spirit of the present disclosure being indicated by the following claims.

It is to be understood that the present disclosure is not limited to the precise construction described above and illustrated in the accompanying drawings, and that various modifications and changes may be made without departing from the scope thereof. The scope of the present disclosure is limited only by the appended claims.

The invention claimed is:

1. A method for processing a paging cause, performed by a base station, and comprising:
   receiving a request message requesting the paging cause sent by a specific terminal; and
   sending the paging cause to the specific terminal,
   wherein the request message requesting the paging cause is sent by the specific terminal to the base station based on a second user identity module of the specific terminal in response to the specific terminal establishing a connection with another base station based on a first user identity module.

2. The method according to claim 1, wherein the specific terminal at least comprises:
   a terminal having at least two subscriber identity modules (SIMs).

3. The method according to claim 2,
   wherein the sending of the paging cause to the specific terminal comprises:
   sending the paging cause to the specific terminal based on the request message.

4. The method according to claim 2, wherein the sending of the paging cause to the specific terminal comprises:
   sending the paging cause to the specific terminal based on a protocol provision; or
   sending the paging cause to the specific terminal based on a pre-negotiation between the base station and the specific terminal; or
   sending the paging cause to the specific terminal based on a paging message received from a core network.

5. The method according to claim 2, wherein the sending of the paging cause to the specific terminal comprises:
   in response to the base station supporting the sending of the paging cause, sending the paging cause to the specific terminal.

6. The method according to claim 1,
   wherein the sending of the paging cause to the specific terminal comprises:
   sending the paging cause to the specific terminal based on the request message.

7. The method according to claim 1, wherein the sending of the paging cause to the specific terminal comprises at least one of the following:
   sending the paging cause to the specific terminal based on a protocol provision;
   sending the paging cause to the specific terminal based on a pre-negotiation between the base station and the specific terminal; or
   sending the paging cause to the specific terminal based on a paging message received from a core network.

8. The method according to claim 1, wherein the sending of the paging cause to the specific terminal comprises:
   in response to the base station supporting the sending of the paging cause, sending the paging cause to the specific terminal.

9. The method according to claim 8, wherein the method further comprises:
   sending capability information about whether the base station supports the sending of the paging cause.

10. The method according to claim 9, wherein
    the capability information is carried by a system message; or the capability information is carried by Radio Resource Control RRC signaling.

11. The method according to claim 10, wherein the system message comprises:

a minimum system message; or a system message block other than the minimum system message.

12. A method for processing a paging cause, performed by a specific terminal, and comprising:

sending a request message requesting the paging cause; and receiving the paging cause sent by a base station, wherein the sending of the request message requesting the paging cause comprises:

in response to the specific terminal establishing a connection with another base station based on a first user identity module, sending the request message requesting the paging cause to the base station based on a second user identity module of the specific terminal.

13. The method according to claim 12, wherein the method further comprises:

receiving capability information indicating whether the base station supports the sending of the paging cause, wherein the request message is sent after the base station is determined based on the capability information to support the sending of the paging cause.

14. The method according to claim 12, wherein, the sending of the request message requesting the paging cause to the base station based on the second user identity module of the specific terminal, in response to the specific terminal establishing the connection with the other base station based on the first user identity module, comprises:

in response to the specific terminal establishing the connection with the other base station based on the first user identity module and transmitting on the connection, sending the request message requesting the paging cause to the base station based on the second user identity module of the specific terminal.

15. The method according to claim 14, wherein the method further comprises:

in response to the specific terminal establishing the connection with the other base station based on the first user identity module, determining whether to respond to the paging message of the base station based on the paging cause sent by the base station.

16. The method according to claim 12, wherein the method further comprises:

in response to the specific terminal establishing the connection with the other base station based on the first user identity module, determining whether to respond to the paging message of the base station based on the paging cause sent by the base station.

17. A communication device, comprising: a processor, a transceiver, a memory, and an executable program stored on the memory and configured to be executed by the processor, wherein the processor is configured, when executing the executable program, to perform the method for processing a paging cause according to claim 12.

18. A communication device, comprising: a processor, a transceiver, a memory, and an executable program stored on the memory and configured to be executed by the processor, wherein the processor is configured, when executing the executable program, to perform a method for processing a paging cause, comprising:

receiving a request message requesting the paging cause sent by a specific terminal; and sending the paging cause to the specific terminal, wherein the request message requesting the paging cause is sent by the specific terminal to the communication device based on a second user identity module of the specific terminal in response to the specific terminal establishing a connection with another communication device based on a first user identity module.

* * * * *